UNITED STATES PATENT OFFICE.

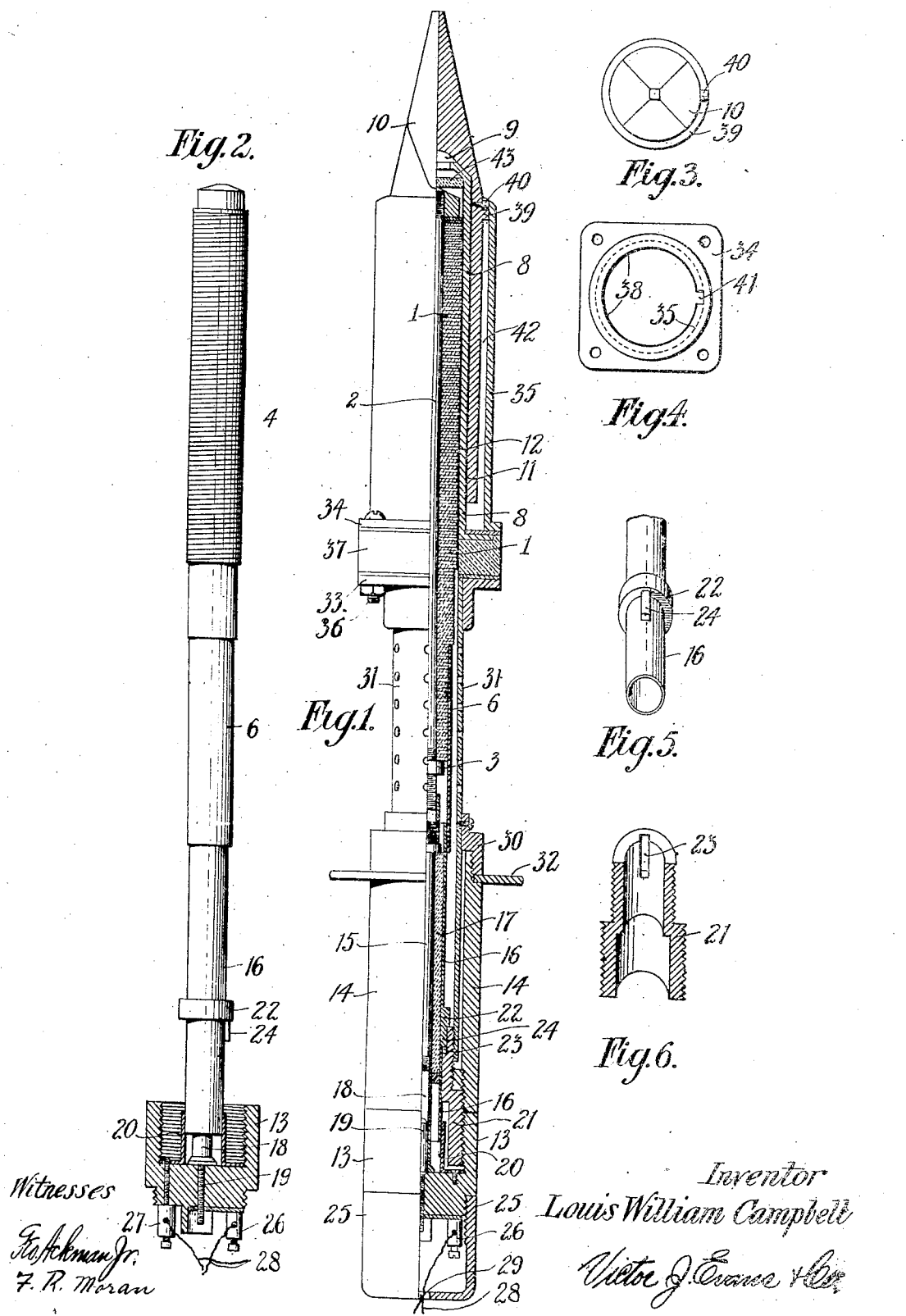

LOUIS WILLIAM CAMPBELL, OF SOUTH YARRA, VICTORIA, AUSTRALIA.

ELECTRICALLY-HEATED SOLDERING-IRON.

1,128,102. Specification of Letters Patent. Patented Feb. 9, 1915.

Application filed January 7, 1914, Serial No. 810,831. Renewed December 14, 1914. Serial No. 877,279.

*To all whom it may concern:*

Be it known that I, LOUIS WILLIAM CAMPBELL, of 268 Toorak road, South Yarra, in the State of Victoria, Commonwealth of Australia, business representative, have invented certain new and useful Improvements in Electrically-Heated Soldering-Irons, of which the following is a specification.

This invention relates to improvements in electrically heated soldering irons for melting and applying solder to unite adjacent metallic edges or surfaces and used by plumbers, tinsmiths and other workers in sheet metal and the like.

Hitherto it has been proposed to construct an electrically heated soldering iron with a copper bit having a bifurcation in the rear or handle end within which is located the heating unit comprising coils of resistance wire mounted on a prism or rod of mica and furnished with lead and return wires which are insulated from each other by coverings of beads or the like. The lead and return wires are covered with a perforated tube one end of which is connected to the copper bit while the opposite end is provided with a handle of non-conducting material having a conveniently operated means for connecting up the said wires with supply wires. The disadvantages experienced with this form of construction are the loss of heat occasioned by the fact that only part of the heating unit is employed to heat the bit and the liability that exists of the bead-covering of the wire becoming broken through rough usage. The heat from the uncovered edges of the heating unit radiates into the atmosphere and is lost and should the bead covering of the wires become broken the wires are liable to contact with each other and fuse or contact with the perforated metal shield with similar injurious results.

The present invention has been devised in order to obviate the above mentioned disadvantages by providing certain new and useful improvements which will permit of the utilization of all the heat obtained from the unit and permit of the lead and return wires being arranged in such a way that there is not the least liability of them contacting with each other or with the perforated metal shield or other portion of the implement. Moreover, the invention is directed to the provision of a simple and strong fastening whereby bits of different sizes can be readily attached to or detached from the handle.

In order that the invention together with the mode of carrying the same into practical effect may be readily understood reference will now be had to the accompanying sheet of explanatory drawings, wherein—

Figure 1 is a view in elevation, partly in section, of a soldering iron constructed according to the present invention. Fig. 2 is a view illustrating the heating unit and electrical connections, and Figs. 3 to 6 are views of constructional details embodied in the invention.

In these drawings the numeral 1 designates a cylindrical rod formed of a plurality of small mica washers threaded on a bar 2 and held firmly and closely thereon by suitable longitudinal or end pressure. The necessary end pressure can be obtained by screwing the bar 2 and using nuts 3 or the like clamping means. Over one end of the rod 1 thus formed is coiled a high resistance wire 4 one end of which is connected to the adjacent end of the bar 2 while the opposite end traverses a groove formed helically in the periphery of and is connected to a metal sleeve 6 fitted rigidly to the other end of the said rod. The ends of the wire 4 are preferably fused where they connect with the bar 2 and sleeve 6.

The rod 1 with its winding of high resistance wire forms the heating unit and this unit and mode of manufacturing the same is particularly described in my previous application for Letters Patent in the United States of America Serial No. 774,256 filed June 17th, 1913. The end of the supporting rod 1 provided with the coils of resistance wire is inserted in a sheath 8 which is adapted to be inserted in a hole 9 formed axially in the rear end of a copper bit 10 and is insulated therefrom by packing 11 of suitable non-conducting material, preferably mica. A packing 12 similar to 11 is employed to insulate the wires 4 from the sides of the sheath 8.

The sleeve 6 on the inner end of the rod 1 is arranged concentrically with the corresponding end of the bar 2 and the said bar and sleeve are detachably connected by a bar 15 and tube 16, respectively, to a concentric plug 13 screwed to the end of a handle 14. The bar 15 is insulated from the tube 16 by mica 17 or other non-conducting material which is secured rigidly within the said tube in an approved way. The inner end of the bar 15 is fitted with a piece of tubing 18 which is adapted to fit snugly over a connecting jack 19 projecting centrally from the plug 13. Secured to the said plug 13 and concentrically around the connecting jack 19 is a sleeve 20 which snugly engages the inner end of the tube 16. The handle 14 is formed of fiber or other suitable material and the plug 13 screws onto the projecting portion of a nipple 21 screwed into the handle. The forward end of the nipple 21 normally lies adjacent to a collar 22 formed on the tube 16 and a recess 23 is formed in the nipple to accommodate a feather 24 formed on the periphery of the said tube. The feather 24 and recess 23 prevent the heating unit being revolved when the plug 13 is being screwed to the handle, and there is sufficient play in the said recess to provide for the expansion of the parts when heated.

A cap 25 is secured detachably to the outer end of the plug 13 to cover terminals 26 and 27, which are connected to the jack 19 and sleeve 20. The said cap forms the end of the handle and the supply wires 28 pass through a hole 29 in the end thereof and are secured to the terminals 26 and 27. The forward part of the handle screws into a collar 30 fitted rigidly to a piece of perforated tubing 31 and between the said collar and handle is secured an enlarged washer 32 which forms a guard to prevent the hand slipping forwardly on to the perforated tubing.

A flange 33 is formed on the outer end of the perforated tubing 31 and holes are made therein to correspond with a hole formed in a flange 34 on the inner end of a sleeve 35. The sleeve 35 is arranged to pass over the point of the bit 10 and the flange 34 on the said sleeve and the flange 33 on the tubing are fastened together securely by bolts 36 or the like passing through the holes therein. A piece of asbestos wood 37 or similar non-conducting material is placed between the flanges on the tubing and on the sleeve 35 and is retained in position by the bolts 36. The outer end of the sleeve 35 is formed with an inwardly projecting flange or collar 38 which bears against the outer face of a collar 39 formed on the bit. The rotation of the bit is prevented by forming a projection 40 thereon which is accommodated by a recess 41 in the flange 38 on the outer end of the sleeve 35. The inside diameter of the sleeve 35 is sufficiently large to permit of it passing freely over the collar 39 on the bit and consequently an annular air space 42 is formed between the two members. The said air space 42 forms an insulation that will be found extremely useful for preventing radiation in a lateral direction and for directing the heat toward the points of the bit.

The sheath 8 prevents injury to the heating unit when attaching or detaching a bit and it will pass freely into the hole formed axially in the said bit. The end of the said sheath is provided with disks of mica 43 or other non-conducting material to prevent the end of the bar 2 contacting with the said sheath or with the bit. The sheath 8 for the heating element may be secured to the asbestos or non-conducting material placed between the tubing of the sleeve and lined with sheet mica or other non-conducting material. The lead for the electric current for heating the unit comprises the terminal 26, sleeve 20, tube 16, sleeve 6, high resistance wire 4 and the return lead comprises the bar 2, bar 15, tubing 18, jack 19 and terminal 27.

It will be readily obvious that the various parts of the implement can be assembled and taken apart easily and quickly and that as all the parts are accessible they can be readily renewed or replaced when required.

What I do claim is:—

1. An electrically heated soldering iron comprising a bit formed with an axial bore, a heating element disposed within the bore in said bit, a sheath surrounding said element within said bore, a perforated tube surrounding said heating element coaxial with the bore in said bit, a connection between said bit and tube, a handle connected with said tube, and means whereby said heating element may be energized.

2. An electrically heated soldering iron comprising a bit having an axial bore formed therein, a sheath within said bore, a heating element within said sheath, a sleeve surrounding said bit concentrically of said heating element and spaced apart from the bit whereby an air space is formed, a rigid connection between said sleeve and bit, a perforated tube surrounding said heating element coaxial with said sleeve, a connection between said sleeve and tube, a handle, a detachable connection between said handle and tube, and means whereby said heating element may be supplied with current.

3. An electrically heated soldering iron comprising a bit having an axial bore formed therein, a sheath within said bore, a heating element within said sheath, a sleeve surrounding said bit concentrically of said heating element and spaced apart from the bit whereby an air space is formed, a rigid connection between said sleeve and bit, a perforated tube surrounding said heating element coaxial with said sleeve, a connection between said sleeve and tube, a handle, a detachable connection between said handle and tube, means whereby said heating element may be supplied with current, a plug connected with the outer end of said handle, and connections between said plug and heating element whereby the latter may be connected up with a source of electrical energy.

4. An electrically heated soldering iron comprising a bit having an axial bore formed therein, a sheath within said bore, a heating element within said sheath, a sleeve surrounding said bit concentrically of said heating element and spaced apart from the bit whereby an air space is formed, a rigid connection between said sleeve and bit, a perforated tube surrounding said heating element coaxial with said sleeve, a connection between said sleeve and tube, a handle, a detachable connection between said handle and tube, means whereby said heating element may be supplied with current, a plug connected with the outer end of said handle, connections between said plug and heating element whereby the latter may be connected up with a source of electrical energy, and a cap connected with said plug and inclosing said electrical connections.

5. An electrically heated soldering iron comprising a bit, a sheath within said bit, a heating element within said sheath, a sleeve surrounding said bit concentrically thereof, a perforated tube coaxial with said sleeve, a connection between said tube and sleeve, a handle, a detachable connection between said handle and tube, and means whereby said heating element may be supplied with current.

In testimony whereof I affix my signature in presence of two witnesses.

LOUIS WILLIAM CAMPBELL.

Witnesses:
 A. N. COOKE,
 W. A. ASHTON.